US006112096A

United States Patent [19]

Hasegawa

[11] Patent Number: 6,112,096

[45] Date of Patent: Aug. 29, 2000

[54] PAGER TERMINAL HAVING A MISSING MESSAGE INDICATOR

[75] Inventor: Kazuhiko Hasegawa, Shizuoka, Japan

[73] Assignee: NEC Corporation, Tokyo, Japan

[21] Appl. No.: 08/918,863

[22] Filed: Aug. 26, 1997

[30] Foreign Application Priority Data

Aug. 27, 1996 [JP] Japan .................................... 8-225097

[51] Int. Cl.[7] ........................................ H04Q 7/06

[52] U.S. Cl. ........................ 455/458; 455/31.1; 455/70; 455/426; 455/466; 340/825.44

[58] Field of Search ................................ 455/31.1, 31.3, 455/38.2, 38.4, 70, 38.1, 426, 458, 466; 370/349, 394, 428; 371/32; 340/825.44

[56] References Cited

U.S. PATENT DOCUMENTS

| | | | |
|---|---|---|---|
| 5,077,830 | 12/1991 | Mallia | 455/38.1 |
| 5,159,331 | 10/1992 | Park et al. | 340/825.44 |
| 5,185,604 | 2/1993 | Nepple et al. | 340/825.44 |
| 5,278,546 | 1/1994 | Weitzen et al. | 340/825.44 |
| 5,315,635 | 5/1994 | Kane et al. | 340/825.44 |
| 5,396,537 | 3/1995 | Schwendman | 340/825.44 |
| 5,673,036 | 9/1997 | Gabrielle | 340/825.44 |
| 5,682,148 | 10/1997 | Gaskill et al. | 340/825.4 |

*Primary Examiner*—Daniel S. Hunter
*Assistant Examiner*—Yemane Woldetatios
*Attorney, Agent, or Firm*—Scully, Scott, Murphy & Presser

[57] ABSTRACT

For informing a user of a pager terminal for receiving message information attributed with a serial message number of the serial message numbers of missing message information, the pager terminal having a missing massage indicator comprises, a message status memory (17) prepared with a message reception table having a reception confirmation flag area and a reception failure flag area for each of possible serial message numbers. A logic '1' flag is set in the reception confirmation flag area corresponding to the serial message number N of the message lastly stored. When a message having a message number M is newly received, the numbers M and N are compared. When M≠N+1, logic '1' flags are set in all the reception failure flag areas corresponding to the serial message numbers from N+1 to M−1 for indicating the reception failure of these messages.

3 Claims, 3 Drawing Sheets

FIG.3(A)

| SERIAL MESSAGE NUMBER | RECEPTION CONFIRMATION FRAG AREA | RECEPTION FAILURE FRAG AREA |
|---|---|---|
| ⋮ | ⋮ | ⋮ |
| N | 1 | 0 |
| ⋮ | ⋮ | ⋮ |

FIG.3(B)

| SERIAL MESSAGE NUMBER | RECEPTION CONFIRMATION FRAG AREA | RECEPTION FAILURE FRAG AREA |
|---|---|---|
| ⋮ | ⋮ | ⋮ |
| N | 0 | 0 |
| N+1 ~ M−1 | 0 | 1 |
| M | 1 | 0 |
| ⋮ | ⋮ | ⋮ |

FIG.4

| SERIAL MESSAGE NUMBER | MESSAGE INFORMATION |
|---|---|
| N | MESSAGE INFORMATION |
| M | MESSAGE INFORMATION |
| ⋮ | ⋮ |

PAGER TERMINAL HAVING A MISSING MESSAGE INDICATOR

BACKGROUND OF THE INVENTION

The present invention relates to a pager terminal, and more particularly to a pager terminal having a missing massage indicator for informing a user of message numbers appended to messages that are missed to be received.

There is a "serial message number service", which is offered as a supplementary service to users of a high grade pager system, such as the FLEX-TD (Time Diversity) system. In the serial message number service, a message number, which is appended serially to each call of a specified user of the pager system, is appended to each massage information. The message number is useful for transmitting message information reliably to the specified user. However, it is important to provide an effective measure to make use of the message number for detecting and indicating reception failure also on the side of the pager terminal receiving the message number.

As a prior art of a method for preventing reception failure in this type of pager system, there is a Japanese patent application entitled "Method for detecting reception failure of transmitted messages" and laid open as a Provisional Publication No. 119725/92.

In the prior art, the transmitting station transmits, periodically to each pager terminal, a serial message number information comprising information of the calling number, the date information, the serial message number at present time, and the identification information indicating that the message is the serial message number information, besides ordinary message information which is transmitted together with the calling number, the date information, a serial message number counted from the beginning of the date and the identification information indicating that the message information is an ordinary message information.

At each pager terminal receiving the message information, it is discriminated whether the received message information is the ordinary message information or the serial message number information. When it is the ordinary message information, an internal count number is incremented and stored with the date information. When it is the serial message number information, the serial message number of the information is compared with the internal count number for detecting whether there is any missing message or not to be informed to the user with an alarm through a speaker.

As above described, only when the serial message number information, which is transmitted periodically from the transmitting station for reporting the current serial message number, is received, the current serial message number is compared with the internal count number incremented at each reception of the ordinary message information, in the prior art, and an alarm is sounded through the speaker to report the reception failure to the user when the compared two numbers do not agree.

Therefore, the user is informed of an existence of a reception failure, but he cannot decide, at the instant, that which one of the messages is missed to be received. The missing message information might be an important information for the user.

SUMMARY OF THE INVENTION

Therefore, a primary object of the present invention is to provide a pager terminal, wherein serial message numbers of the missing messages can be informed to the user with a display device for reliably preventing reception failure of messages important for the user.

In order to achieve the object, a pager terminal of the invention, for receiving message information transmitted from a transmitting station with a serial message number appended sequentially to each call of the pager terminal in a certain period, has a missing message indicator comprising:

a message memory for storing the message information in order of reception together with the serial message number;

a message status memory prepared with a message reception table having a reception confirmation flag area and a reception failure flag area for each of serial message numbers predetermined as possible to be appended in the certain period, wherein a logic '1' flag is set in the reception confirmation flag area corresponding to the message information lastly received and a logic '1' flag is set in the reception failure flag area corresponding to each of the serial message numbers of the message information missed to be received; and control means for searching the serial message number of the message information lastly received referring the message reception table when there is message information newly received, comparing the serial message number of the message information lastly received to the serial message number of the message information newly received, setting a logic '1' flag in the reception failure flag area corresponding to each of the serial message numbers following the serial message number of the message information lastly received and preceding the serial message number of the message information newly received when the serial message number of the message information newly received differs more than one to the serial message number of the message information lastly received, changing the logic '1' flag in the reception confirmation flag area corresponding to the serial message number of the message information lastly received to '0' and setting a logic '1' flag in the reception confirmation flag area corresponding to the serial message number of the message information newly received, and informing the user of the serial message numbers each whereof a logic '1' flag is set in the reception failure flag area when there is any thereof.

Therefore, the user can easily and reliably request re-transmission of the missing messages corresponding to the serial message numbers indicated by the missing message indicator.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 3(A) is a schematic diagram illustrating a message reception table prepared in the message status memory 17 of FIG. 1;

FIG. 3(B) is another schematic diagram illustrating the message reception table; and FIG. 4 is a schematic diagram illustrating message information stored in the message memory 16 of FIG. 1.

DETAILED DESCRIPTION OF THE PREFERRED EMBODIMENTS

Now, embodiments of the present invention will be described in connection with the drawings.

Figure 1:
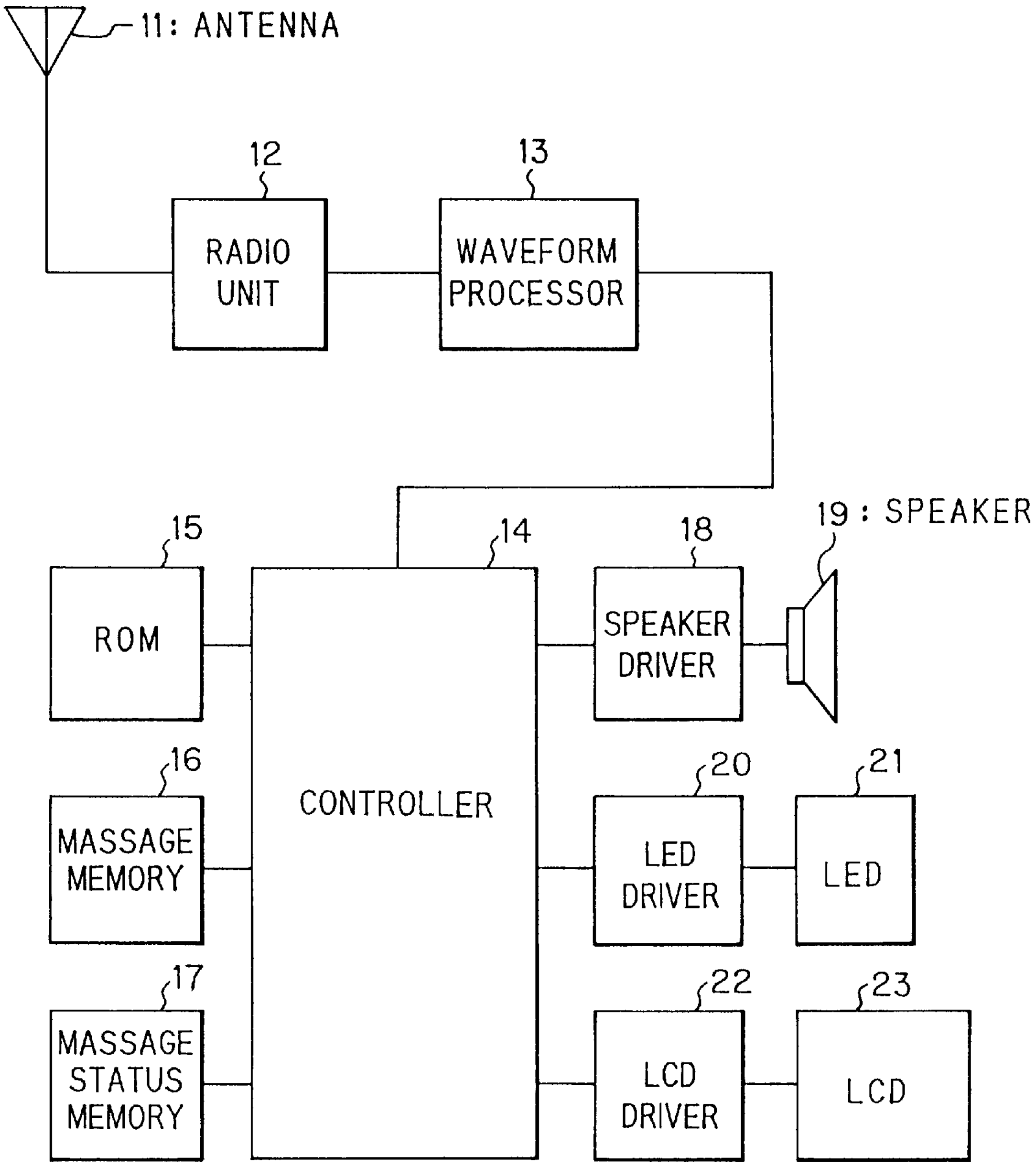
FIG. 1 is a block diagram illustrating a principal configuration of a pager terminal according to an embodiment of the invention.

FIG. 1 is a block diagram illustrating a principal configuration of a pager terminal according to an embodiment of the invention.

Referring to FIG. 1, the pager terminal comprises an antenna 11, a radio unit 12, a waveform processor 13, a controller 14, a ROM (Read Only Memory) 15, a message memory 16, a message status memory 17, a speaker 19 with a speaker driver 18, an LED (Light Emitting Diode) 21 with an LED driver 20, and an LCD (Liquid Crystal Display) 23 with an LCD driver 22.

The radio unit 12 receives, amplifies and demodulates selective calling signals coming through the antenna 11. The waveform processor 13 processes and converts the demodulated signals into a predetermined signal format. The ROM 15 stores the call number of the pager terminal. The message memory 16 consisting of a RAM (Random Access Memory) stores message information received with serial message numbers in order of reception. In the message status memory 17 (RAM), there is provided a message reception table used for detecting serial message numbers of the missing messages. The speaker 19 reports message arrivals and alarms the reception failure. The LED 21 indicates the message arrivals. The LCD 23 displays the message information and the serial message numbers of the missing messages. And the controller 14 controls the whole system of the pager terminal.

Figure 2:
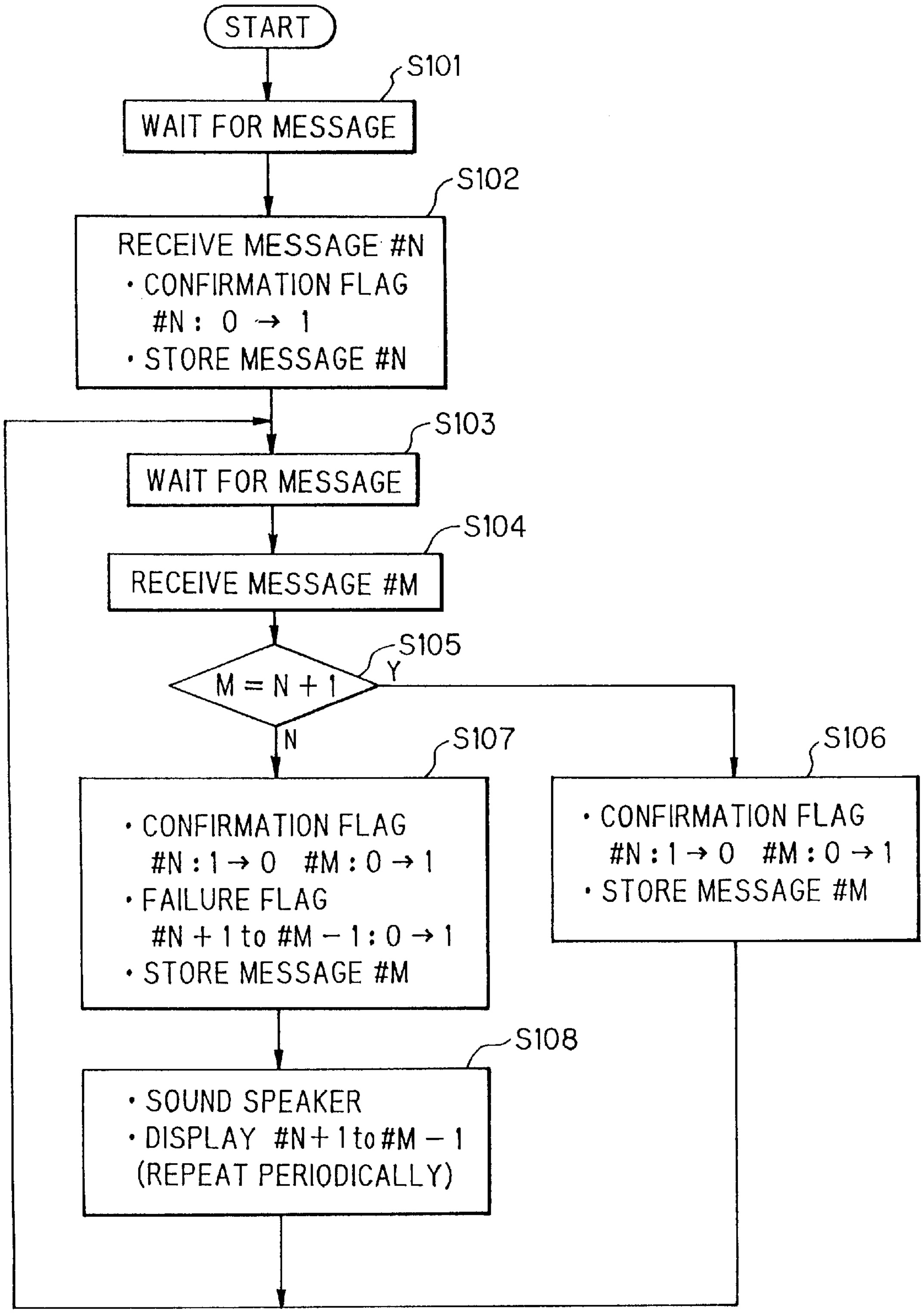
FIG. 2 is a flowchart illustrating an operational flow of a message receiving process according to the embodiment of FIG. 1.

Now, operation of the pager terminal of FIG. 1 is described referring to FIGS. 2 to 4.

FIG. 2 is a flowchart illustrating all operational flow of a message reception according to the embodiment, FIG. 3(A) and FIG. 3(B) are schematic diagrams illustrating the message reception table prepared in the message status memory 17, and FIG. 4 is a schematic diagram illustrating message information stored in the message memory 16.

When a call signal is received by the antenna 11, it is amplified and demodulated in the radio unit 12, and converted into the predetermined signal format in the waveform processor 13 to be supplied to the controller 14.

The controller 14 compares the call number in the output of the waveform processor 13 to the contents of the ROM 15 consisting of a programmable ROM. When a coincidence is obtained in the comparison, the controller 14 drives the speaker 19 through the speaker driver 18, and lights the LED through the LED driver 21 to report the arrival of a message forwarded to the user.

When a message information added with a serial message number N is received, the controller 14 sets a flag of logic '1' at a reception confirmation flag area corresponding to the serial message number N of the message reception table in the message status memory 17 (refer to FIG. 3(A)), and writes the serial message number and the message information correspondingly in the message memory 16 as shown in FIG. 4.

Then, when a message information with a different serial number is received, the controller 14 searches the reception confirmation flag areas of the message reception table, and the serial message number whereof a logic '1' flag is set in the reception confirmation flag area, that is, the serial message number of the lastly received message information, is compared with the serial message number of the message information newly received.

When the compared two serial message numbers show continuity, the logic '1' flag in the reception confirmation flag area of the serial message number of the former message is reset to logic '0', and a flag of logic '1' is set in the reception confirmation flag area corresponding to the serial message number of the newly received message. After the procedure, the newly received message information is written with its serial message number in a field following the field of the last stored message information as shown in FIG. 4.

When the compared two serial message numbers do not show continuity, logic '1' flags are set to all reception failure flag areas corresponding to serial message numbers in a range from the next of the message number having logic '1' flag in the reception confirmation flag area, to the serial message number preceding to that of the newly received message information of the message reception table.

After the procedure, the newly received message information is written with its serial message number in a field following the field of the last stored message information in the message memory 16.

Then, all the serial message numbers corresponding to logic '1' flags in the reception failure flag areas of the message reception table of the message status memory 17 are displayed on the LCD 23 through the LCD driver 22, and the speaker 19 is driven through the speaker driver 18 to alarm the user of the existence of reception failure, with a frequency different from that for reporting the message arrival.

The user of the receiver, notified of the existence of reception failure by the sounding of the speaker 19 and the display on the LCD 23, operates all operation panel (not shown in the drawings) in a predetermined way to send a request, to the transmitting station, for re-transmission of the missing messages corresponding to the serial message numbers indicated on the LCD 23.

In an initialization, which is performed automatically at the same time with the initialization at the transmitting station of the serial message number, at 0:00 a.m., for example, the controller 14 resets all the flags in the reception confirmation flag areas and the reception failure flag areas to logic '0'.

The message information stored in the message memory 16 shown in FIG. 4 are read-out and displayed on the LCD 23 through the LCD driver 22 according to the user's predetermined operation of the operation panel (not shown in the drawings).

Now, detailed flow of the message receiving processing will be described referring to the flowchart of FIG. 2 together with FIG. 1, FIG. 3(A) and FIG. 3(B).

When a power switch (not shown in the drawing) is closed in the receiver for activating the pager terminal, the message status memory 17 is initialized and all the reception confirmation flag areas and the reception failure flag areas are reset with flags of logic '0', and the receiver enters into a waiting state (at step S101 of FIG. 2).

Assume that message information having a serial message number N, for example, transmitted from the transmitting station (not shown in the drawings), is received in the waiting state. When the controller 14 detects coincidence between the call number of the transmitted message information and the call number stored in the ROM 15, a flag of logic '0' in the reception confirmation flag area of the serial message number N of the message status memory 17, is changed to a flag of logic '1' (the flag in the reception failure flag area remains unchanged). The serial message number N and the message information are written at the top of the message memory 16 (at step S102), and the system reenters into the waiting state (at step S103).

Here, it is noted that the pager terminal is driven by a battery and the power switch is kept closed during the battery is available and that the serial message number N of the message information received firstly after the first, or the daily initialization should be 0, in general.

When another message signal of the same call number having a serial message number M, for example, is received (at step S104), the controller 14 searches a logic '1' flag in the reception confirmation flag area of the message reception table. So, the serial message number N, having the logic '1' flag in the reception confirmation flag area, is detected and is compared with the serial message number M of the newly received message information in order to check whether there is a continuity between the two serial message numbers (at step S105).

When M=N+1 (indicating the continuity) is obtained as the result of the comparison, it is judged that there is no reception failure. The flag of logic '1' in the reception confirmation flag area of the serial message number N of the message reception table is changed to a flag of logic '0', a flag of logic '0' in the reception confirmation flag area of the serial message number M is changed to a flag of logic '1', and the serial message number M and the message information are written in the message memory 16 following the serial message number N and its message information (at step S106), the process flow returning to step S103.

When M≠N+1 is detected at step S105 as the result of the comparison, it is judged that there is reception failure. The flag of logic '1' in the reception confirmation flag area of the serial message number N of the message reception table is changed to a flag of logic '0'. Logic '1' flags are set in all the reception failure flag areas corresponding to the serial message numbers from N+1 to M−1, as illustrated in FIG. 3(B). The flag of logic '0' in the reception confirmation flag area of the serial message number M is changed to a flag of logic '1'. The serial message number M and the message information are written in the message memory 16 following the serial message number N and its message information (at step S107).

The controller 14 displays the serial message numbers from N+1 to M−1 on the LCD 23 through the LCD driver 22, and sounds the speaker 19 through the speaker driver 18 at the frequency for alarming a reception failure (at step S108), the frequency being different from the frequency for reporting the message arrival. After the user is thus informed of the occurrence of reception failure, the process flow returns to the waiting state at step S103.

As heretofore described, there is provided a reception confirmation flag area and a reception failure flag area for each serial message number (from 0 to 63, for example) in the message reception table of the message status memory 17 of the embodiment. When message information having a serial message number is received from the transmitting station, a logic '1' flag is set in the reception confirmation flag area corresponding to the serial message number of the newly received message information, indicating the serial message number of the last received message information. When a message having a different serial message number is received, the serial message number of the newly received message is compared to the serial message number having a logic '1' flag in the reception confirmation flag area of the message reception table. The serial message numbers of the missing messages are identified from the comparison. Logic '1' flags are set in the reception failure flag areas corresponding to the message numbers of the missing messages. The flag in the reception confirmation flag area corresponding to the last stored message is changed from logic '1' to logic '0', and the flag in the reception confirmation flag area corresponding to the newly received message information is changed from logic '0' to logic '1'. And the process flow returns in a state of waiting for the next message information.

Therefore, the serial message numbers of the missing message information can be easily identified in the embodiment.

The contents of the message reception table, that is, the serial message numbers corresponding logic '1' flags in the reception failure flag areas, are displayed on the LCD 23. The occurrence of the reception failure is alarmed by sounding the speaker 19 at a predetermined frequency. Thus, the user can easily know the serial message numbers of the missing message information, for requesting re-transmission thereof.

Therefore, the user call reliably request re-transmission of the missing messages corresponding to the serial message numbers reported as the messages of the reception failure.

Further, the serial message numbers of the missing messages may be alarmed periodically, or they may be displayed according to a request of the user by a predetermined command input, since information of the serial message numbers of the missing messages is always revised and stored in the message reception table, in the embodiment.

What is claimed is:

1. A pager terminal for receiving message information transmitted from a transmitting station with a serial message number appended sequentially to each call of the pager terminal in a certain period, wherein said pager terminal includes a missing message indicator for informing a user of the pager terminal of serial message numbers appended to message information which has not been received by referring to the serial message number of the message information lastly received and the serial message number of the message information newly received, wherein said missing message indicator comprises:

a message memory for storing the message information in order of reception together with the serial message number;

a message status memory prepared with a message reception table having a reception confirmation flag area and a reception failure flag area within said message reception table for each of serial message numbers predetermined as possible to be appended in the certain period, wherein a logic '1' flag is set in said reception confirmation flag area corresponding to said message information lastly received and a logic '1' flag is set in said reception failure flag area corresponding to each of the serial message numbers of the message information missed to be received; and control means for searching the serial message number of said message information lastly received referring to said message reception table when there is message information newly received, comparing the serial message number of said message information lastly received to the serial message number of said message information newly received, setting a logic '1' flag in said reception failure flag area of said message reception table corresponding to each of the serial message numbers following the serial message number of said message information lastly received and preceding the serial message number of said message information newly received when the serial message number of said message information newly received differs more than one from the serial message number of said message information lastly received, changing the logic '1' flag in said reception confirmation flag area of said message reception table corresponding to the serial message number of said message information lastly received to '0' and setting a logic '1' flag in said reception confirmation flag area corresponding to the serial message number of said message information newly received, and informing the user of said serial message numbers each whereof a logic '1' flag is set in said reception failure flag area when there is any thereof.

2. The pager terminal recited in claim 1 wherein said missing message indicator informs periodically the user of said serial message numbers appended to message information which is missed to be received.

3. The pager terminal recited in claim 1 wherein said missing message indicator informs the user of said serial message numbers appended to message information which is missed to be received according to a request of the user.

* * * * *

UNITED STATES PATENT AND TRADEMARK OFFICE
CERTIFICATE OF CORRECTION

PATENT NO. : 6,112,096
DATED : August 29, 2000
INVENTOR(S) : K. Hasegawa

It is certified that error appears in the above-identified patent and that said Letters Patent is hereby corrected as shown below:

Column 3,
Line 37, "all Operational" should read -- an operational --

Column 4,
Line 36, "all operation" should read -- an operation --

Column 6,
Line 26, "call" should read -- can --

Signed and Sealed this

Twenty-sixth Day of March, 2002

*Attest:*

JAMES E. ROGAN
*Director of the United States Patent and Trademark Office*

*Attesting Officer*

UNITED STATES PATENT AND TRADEMARK OFFICE

CERTIFICATE OF CORRECTION

PATENT NO. : 6,112,096
APPLICATION NO. : 08/918863
DATED : August 29, 2000
INVENTOR(S) : K. Hasegawa It is certified that error appears in the above-identified patent and that said Letters Patent is hereby corrected as shown below:

On The Title Page, item [56], References Cited, FOREIGN PATENT DOCUMENTS: Insert --Japan 4-119725 4/21/92--

Signed and Sealed this

Nineteenth Day of December, 2006

JON W. DUDAS

*Director of the United States Patent and Trademark Office*

UNITED STATES PATENT AND TRADEMARK OFFICE

CERTIFICATE OF CORRECTION

PATENT NO. : 6,112,096

APPLICATION NO. : 08/918863
DATED : August 29, 2000
INVENTOR(S) : Kazuhiko Hasegawa It is certified that error appears in the above-identified patent and that said Letters Patent is hereby corrected as shown below:

On the Title Page, item [56], Col. 2, line 5, References Cited, FOREIGN PATENT DOCUMENTS: Insert:

-- EPO 0622765A1 11/2/94

JAPAN 04216220 12/17/90

GB 2253503A 11/29/91 --

Signed and Sealed this

Twenty-third Day of October, 2007

JON W. DUDAS

*Director of the United States Patent and Trademark Office*